(12) United States Patent
Sugaya

(10) Patent No.: US 9,143,264 B2
(45) Date of Patent: Sep. 22, 2015

(54) OPTICAL TRANSMISSION DEVICE AND OPTICAL TRANSMISSION SYSTEM

(75) Inventor: Yasushi Sugaya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 459 days.

(21) Appl. No.: 13/192,662

(22) Filed: Jul. 28, 2011

(65) Prior Publication Data

US 2012/0106971 A1 May 3, 2012

(30) Foreign Application Priority Data

Oct. 28, 2010 (JP) ................................. 2010-242110

(51) Int. Cl.
| H04B 17/00 | (2015.01) |
| G06F 15/16 | (2006.01) |
| H04J 14/00 | (2006.01) |
| H04J 13/14 | (2011.01) |
| H04J 14/02 | (2006.01) |
| H04B 10/50 | (2013.01) |
| H04B 10/516 | (2013.01) |

(52) U.S. Cl.
CPC ........ *H04J 14/0279* (2013.01); *H04B 10/5059* (2013.01); *H04B 10/516* (2013.01); *H04J 14/026* (2013.01); *H04J 14/0275* (2013.01)

(58) Field of Classification Search
USPC ................. 398/43, 79, 97, 182, 173
See application file for complete search history.

(56) References Cited

U.S. PATENT DOCUMENTS

| 5,666,383 | A | * | 9/1997 | Huang et al. .................. 375/260 |
| 5,857,147 | A | * | 1/1999 | Gardner et al. ............ 455/67.11 |
| 6,415,133 | B1 | * | 7/2002 | Brede et al. .................. 455/3.05 |
| 7,277,633 | B2 | | 10/2007 | Yamamoto |
| 7,570,000 | B2 | | 8/2009 | Miyazaki et al. |
| 7,756,059 | B1 | * | 7/2010 | Bharghavan ................... 370/252 |
| 7,813,655 | B2 | | 10/2010 | Kikuchi |
| 8,369,794 | B1 | * | 2/2013 | Bharghavan et al. ........... 455/69 |
| 8,456,993 | B1 | * | 6/2013 | Bharghavan ................... 370/232 |
| 2002/0059619 | A1 | * | 5/2002 | Lebar ............................... 725/87 |
| 2003/0002446 | A1 | * | 1/2003 | Komaili et al. ................ 370/252 |
| 2005/0055203 | A1 | * | 3/2005 | Makinen et al. ............... 704/229 |
| 2005/0143984 | A1 | * | 6/2005 | Makinen et al. ............... 704/219 |
| 2006/0051104 | A1 | * | 3/2006 | Yamamoto ..................... 398/209 |
| 2006/0128318 | A1 | * | 6/2006 | Agarossi et al. ................ 455/69 |
| 2006/0133809 | A1 | * | 6/2006 | Chow et al. ..................... 398/66 |
| 2007/0201492 | A1 | | 8/2007 | Kobayashi |
| 2009/0106446 | A1 | * | 4/2009 | Lee ............................... 709/233 |

(Continued)

FOREIGN PATENT DOCUMENTS

| EP | 0700178 A2 | 3/1996 |
| EP | 0806852 | 11/1997 |

(Continued)

OTHER PUBLICATIONS

Extended European Search Report dated Feb. 6, 2012 for European Application No. 11176793.5.

(Continued)

*Primary Examiner* — Oommen Jacob

(74) *Attorney, Agent, or Firm* — Fujitsu Patent Center

(57) ABSTRACT

An optical transmission device includes: an optical signal generator to generate and transmit an optical signal that transmits data; a detector to detect a number of active clients; and a processor to determine transmission rate of the optical signal according to the number of active clients and quality of the optical signal at an optical receiver.

10 Claims, 11 Drawing Sheets

(56) References Cited

U.S. PATENT DOCUMENTS

| | | |
|---|---|---|
| 2009/0196602 A1 | 8/2009 | Saunders et al. |
| 2009/0197608 A1* | 8/2009 | Chin et al. .................. 455/446 |
| 2009/0268675 A1* | 10/2009 | Choi .......................... 370/329 |
| 2009/0287841 A1* | 11/2009 | Chapweske et al. ......... 709/231 |
| 2009/0303384 A1* | 12/2009 | Inoue et al. ................. 348/469 |
| 2010/0023579 A1* | 1/2010 | Chapweske et al. ......... 709/203 |
| 2010/0054750 A1* | 3/2010 | Forgheri et al. ............. 398/136 |
| 2011/0009139 A1* | 1/2011 | Nagata et al. ............... 455/509 |
| 2011/0164620 A1 | 7/2011 | Jinno et al. |
| 2011/0229147 A1* | 9/2011 | Yokoi ......................... 398/172 |
| 2011/0300827 A1* | 12/2011 | Hu et al. ..................... 455/405 |
| 2012/0069162 A1* | 3/2012 | Ota et al. ..................... 348/54 |
| 2012/0195243 A1* | 8/2012 | Choi ............................ 370/311 |

FOREIGN PATENT DOCUMENTS

| | | |
|---|---|---|
| JP | 6-077962 A | 3/1994 |
| JP | 10-075279 A | 3/1998 |
| JP | 2004-356742 A | 12/2004 |
| JP | 2008-533822 | 8/2008 |
| JP | 2008-278488 A | 11/2008 |
| WO | WO-2006/096714 | 9/2006 |
| WO | 2009/100252 A2 | 8/2009 |
| WO | 2010/032844 A1 | 3/2010 |

OTHER PUBLICATIONS

Klekamp, Axel et al., "Transparent WDM Network with Bitrate Tunable Optical OFDM Transponders", OFC/NFOEC 2010, NTuB5, Mar 21, 2010.

Extended European Search Report dated Aug. 14, 2012 for corresponding European Application No. 12174728.1.

JPOA—Japanese Office Action dated Apr. 15, 2014 issued for corresponding Japanese Patent Application No. 2010-242110, with English-language translation.

* cited by examiner

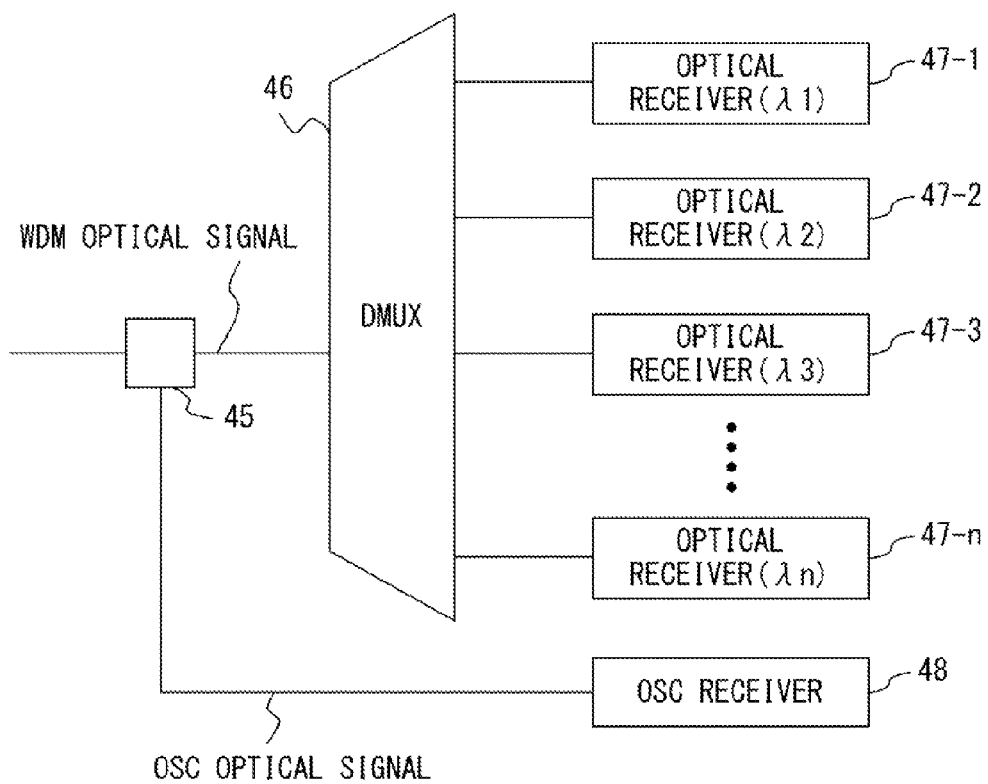
F I G. 4

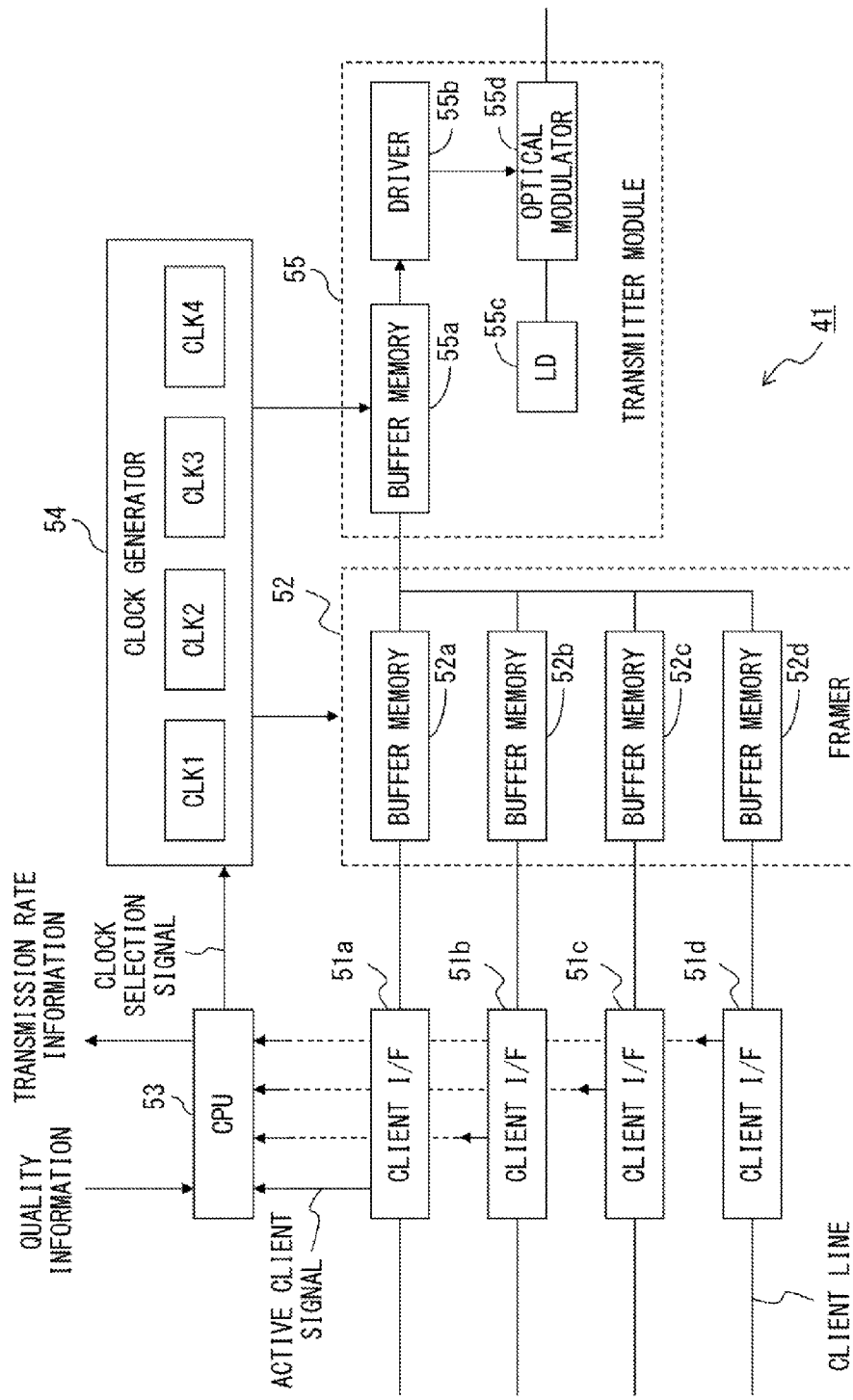
F I G. 5

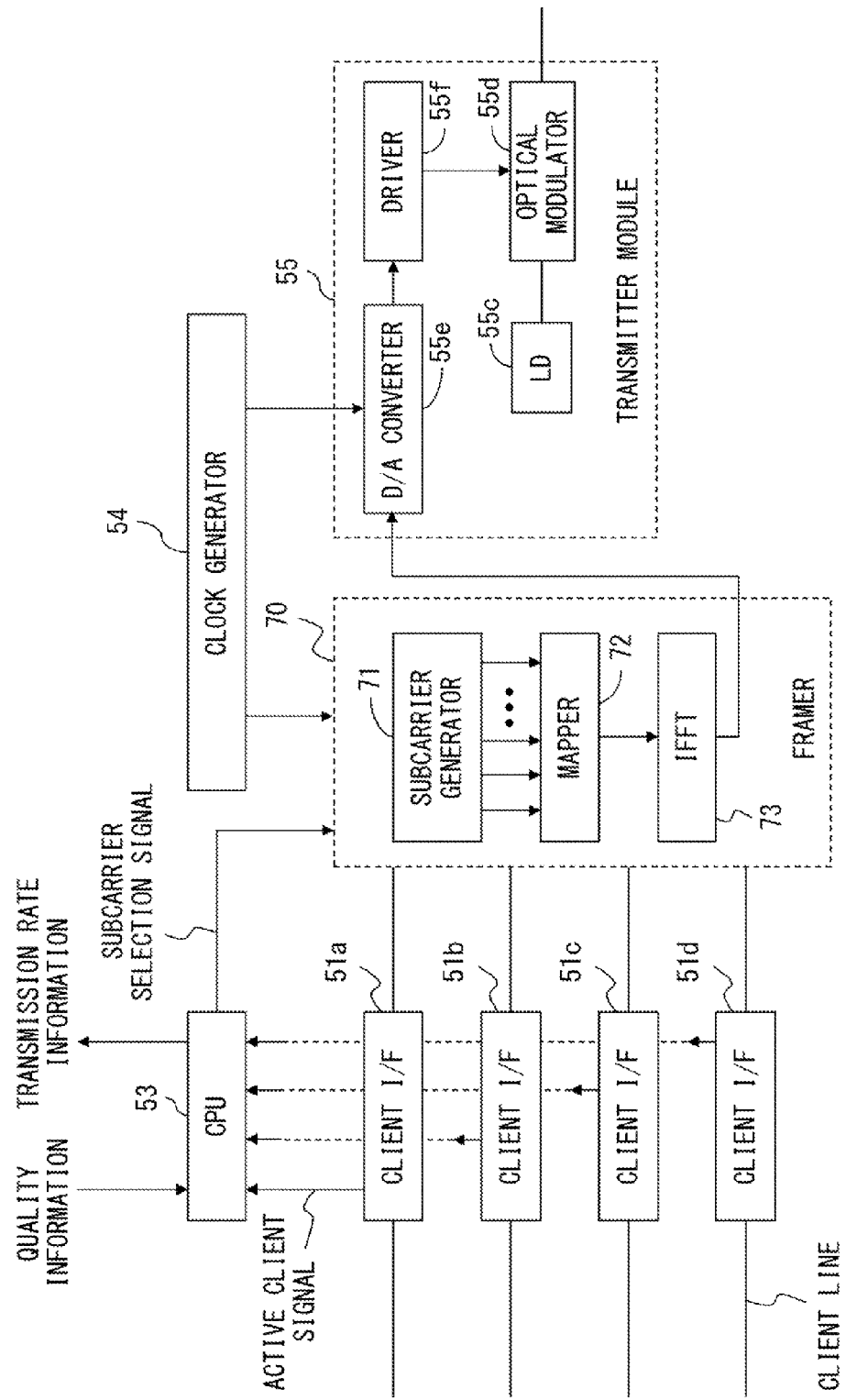
F I G. 11

OPTICAL TRANSMISSION DEVICE AND OPTICAL TRANSMISSION SYSTEM

CROSS-REFERENCE TO RELATED APPLICATIONS

This application is based upon and claims the benefit of priority of the prior Japanese Patent Application No. 2010-242110, filed on Oct. 28, 2010, the entire contents of which are incorporated herein by reference.

FIELD

The embodiments described in this application are related to an optical transmission device and optical transmission system for transmitting an optical signal through an optical fiber, and a method for operating an optical network.

BACKGROUND

When the transmission distance is long in an optical transmission system, an optical signal is attenuated. For this reason, one or more optical nodes are arranged in an optical transmission line so as to construct a long-distance optical transmission system. Each of the optical nodes is provided with an optical amplifier that amplifies an optical signal.

Moreover, the quality of an optical signal deteriorates after being transmitted through an optical fiber. In other words, the quality of an optical signal deteriorates under the influence of, for example, the chromatic dispersion and/or polarization mode dispersion of an optical fiber. Alternatively, the OSNR (Optical Signal-to-Noise Ratio) deteriorates at an optical receiver. For this reason, an optical node may be provided with an optical regenerator (optical regenerative repeater) that regenerates an optical signal.

FIG. 1A is a diagram illustrating an example of an optical transmission system. In the optical transmission system of FIG. 1A, an optical transmission device 1 and an optical transmission device 2 are connected by an optical transmission line 3. The optical transmission line 3 is an optical fiber cable. On the optical transmission line 3, optical nodes 4a, 4b, 4c, and 4d are arranged. Each of the optical nodes 4a, 4b, 4c, and 4d is provided with an optical amplifier to amplify an optical signal.

In the above-described optical transmission system, an optical transmitter of the optical transmission device 1 transmits an optical signal of specified bitrate. The optical nodes 4a, 4b, 4c, and 4d amplify and relay the optical signal, and the optical receiver of the optical transmission device 2 receives the optical signal that is transmitted through the optical transmission line 3.

Comparing with the optical transmission system of FIG. 1A, the optical transmission system of FIG. 1B has an extended optical transmission line 3 and an additional optical node 4e. In other words, the optical transmission system of FIG. 1B has an increased number of spans compared with the optical transmission system of FIG. 1A. Here, as the optical transmission line 3 is extended, the quality of an optical signal (OSNR, residual chromatic dispersion, polarization mode dispersion or the like) deteriorates at the optical transmission device 2. For this reason, this optical transmission system is provided with an optical regenerator 5 to regenerate an optical signal. In the example of FIG. 1B, the optical regenerator 5 is connected to the optical node 4d. The optical regenerator 5 has 3R (Regenerating, Retiming, Reshaping) functions. Accordingly, the quality of an optical signal improves at the optical transmission device 2.

FIG. 1C illustrates the state in which the characteristics of the optical transmission line 3 are deteriorated between the optical nodes 4c and 4d in the optical transmission system of FIG. 1A. Also in this case, the quality of an optical signal deteriorates at the optical receiver of the optical transmission device 2. For this reason, the optical transmission system is also provided with an optical regenerator 5 in order to secure a specified level of quality at the optical transmission device 2. In the example of FIG. 1C, the optical regenerator 5 is connected to the optical node 4c.

For example, Japanese Laid-open Patent Publication No. 06-77962, Japanese Laid-open Patent Publication No. 10-75279, Japanese Laid-open Patent Publication No. 2004-356742, Japanese National Publication of International Patent Application No. 2008-533822, and Japanese Laid-open Patent Publication No. 2008-278488 describe the related art. Moreover, OFC/NFOEC 2009, NTuB5, Axel Klekamp, Olivier Rival, Annalisa Morea, Roman Dischler, Fred Buchali "Transparent WDM Network with Bitrate Tunable Optical OFDM Transponders" describes optical OFDM transponders in which the bitrate is turnable.

As described above, the transmission distance can be extended (i.e., the number of spans can be increased) by arranging an optical regenerator in the optical transmission line of the optical transmission system. Alternatively, the deterioration of an optical fiber can be repaired by providing an optical regenerator in the optical transmission system.

However, an optical regenerator converts an optical signal into an electric signal, and performs the 3R processes to that electric signal. Then the optical regenerator converts the electric signal to which the 3R processes are performed into an optical signal, and outputs the resultant optical signal to the optical transmission line. In other words, the optical regenerator is provided with a photo/electric conversion element and an electric/photo conversion element. For this reason, optical regenerators are expensive, and the circuit size tends to be large. In particular, in WDM networks in which a WDM optical signal is transmitted, it is preferable for an optical regenerator to have a photo/electric conversion element and an electric/photo conversion element for every wavelength. In such cases, an optical regenerator becomes very expensive.

SUMMARY

According to an aspect of an invention, an optical transmission device includes: an optical signal generator to generate and transmit an optical signal that transmits data; a detector to detect a number of active clients; and a processor to determine transmission rate of the optical signal according to the number of active clients and quality of the optical signal at an optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a configuration of a receiver provided for an optical transmission device.

FIG. 5 is a diagram illustrating a configuration of an optical transmitter provided for an optical transmission device of the first embodiment.

FIG. 11 is a diagram illustrating a configuration of an optical transmitter provided for an optical transmission device of the second embodiment.

DESCRIPTION OF EMBODIMENTS

Figure 2:
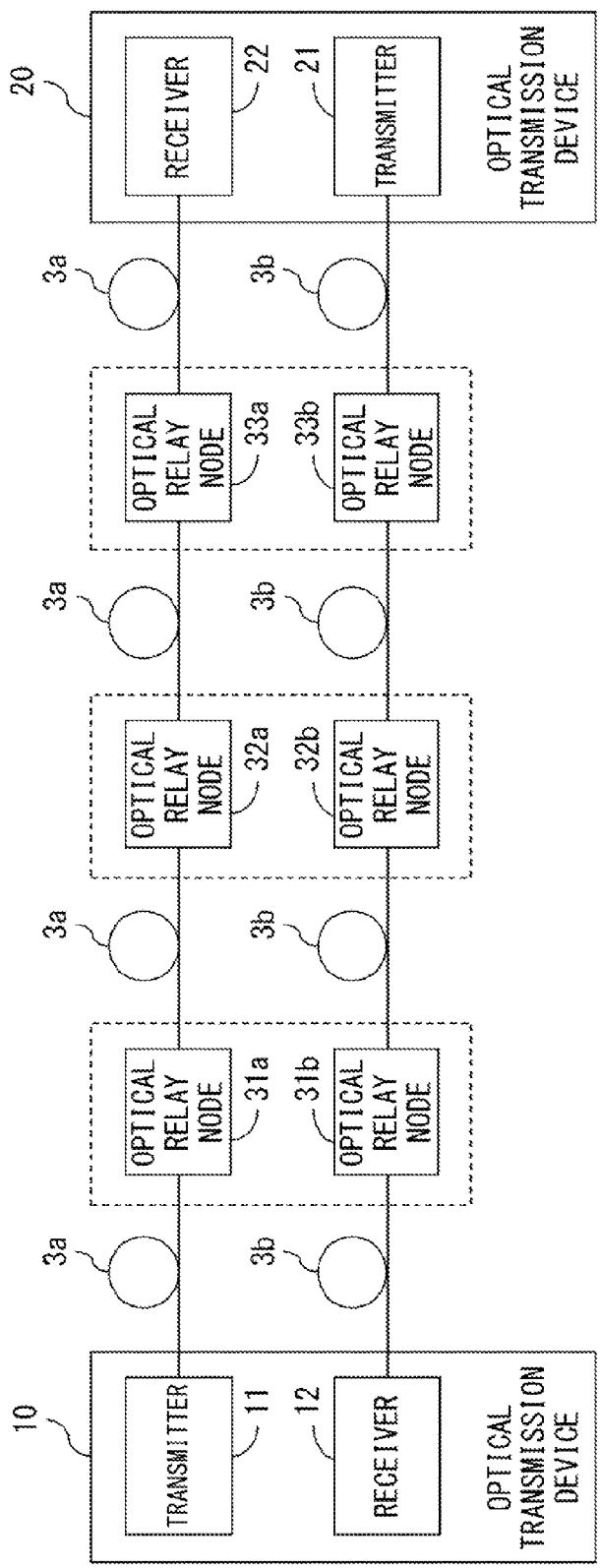
FIG. 2 is a diagram illustrating a configuration of an optical transmission system according to an embodiment.

FIG. 2 is a diagram illustrating a configuration of an optical transmission system according to an embodiment. As illustrated in FIG. 2, the optical transmission system is provided with an optical transmission device 10, an optical transmission device 20, optical transmission lines 3a and 3b, optical nodes 31a, 32a, and 33a, and optical nodes 31b, 32b, and 33b. The optical transmission device 10 and the optical transmission device 20 are connected by optical transmission lines 3a and 3b. The optical transmission line 3a transmits an optical signal from the optical transmission device 10 to the optical transmission device 20. The optical transmission line 3b transmits an optical signal from the optical transmission device 20 to the optical transmission device 10. In other words, the optical transmission devices 10 and 20 are connected via bidirectional transmission paths. The optical transmission lines 3a and 3b are optical fiber cables, respectively.

The optical transmission device 10 includes a transmitter 11 and a receiver 12. The transmitter 11 generates an optical signal, and transmits the generated optical signal to the optical transmission device 20 through the optical transmission line 3a. The receiver 12 receives an optical signal transmitted from the optical transmission device 20 via the optical transmission line 3b. In a similar manner, the optical transmission device 20 includes a transmitter 21 and a receiver 22. The transmitter 21 generates an optical signal, and transmits the generated optical signal to the optical transmission device 10 through the optical transmission line 3b. The receiver 22 receives an optical signal transmitted from the optical transmission device 10 via the optical transmission line 3a.

On the optical transmission line 3a, optical nodes 31a, 32a, and 33a are arranged. Each of the optical nodes 31a, 32a, and 33a includes an optical amplifier to amplify an optical signal on the optical transmission line 3a. In a similar manner, on the optical transmission line 3b, optical nodes 31b, 32b, and 33b are arranged. Each of the optical nodes 31b, 32b, and 33b includes an optical amplifier to amplify an optical signal on the optical transmission line 3b. The optical nodes 31a and 31b may be arranged within one relay device. In a similar manner, the optical nodes 32a and 32b may be arranged within one relay device, and the optical nodes 33a and 33b may also be arranged within one relay device.

In the above-described optical transmission system, the optical transmission devices 10 and 20 transmit and receive a WDM optical signal. In this case, it is preferable that each of the optical nodes 31a, 32a, 33a, 31b, 32b, and 33b includes an optical amplifier to collectively amplify the WDM optical signal.

The configuration and operation of the optical transmission devices 10 is similar to those of the optical transmission devices 20. For this reason, the case of transmitting an optical signal from the optical transmission device 10 to the optical transmission device 20 will be described as an example, and the description of the case of transmitting an optical signal from the optical transmission device 20 to the optical transmission device 10 will be omitted.

Figure 3:
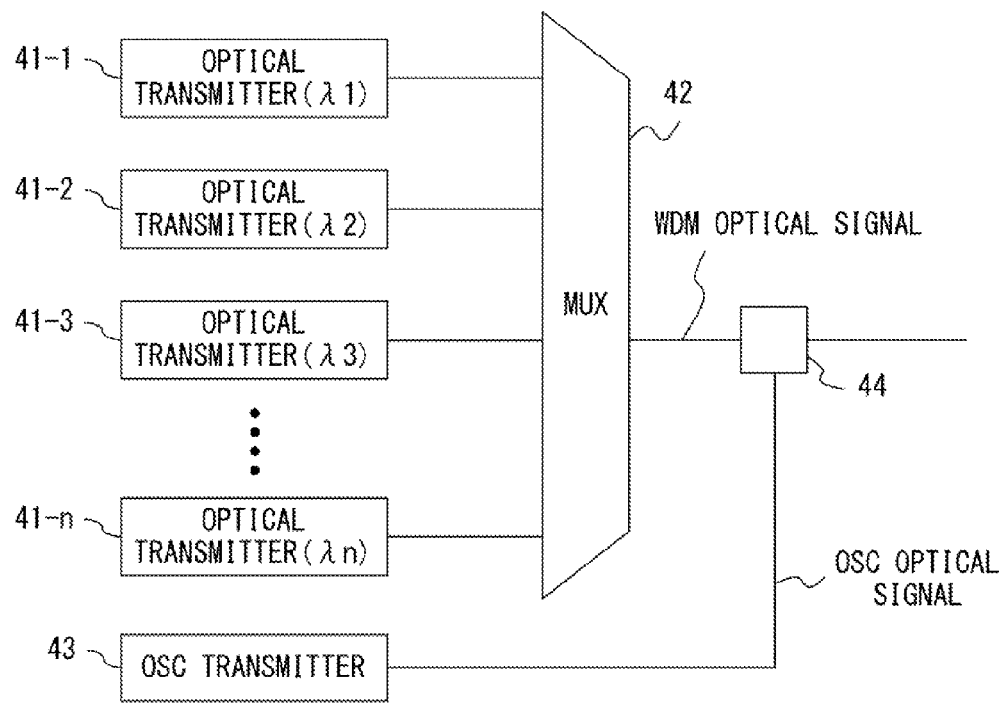
FIG. 3 is a diagram illustrating a configuration of a transmitter provided for an optical transmission device.

FIG. 3 is a diagram illustrating a configuration of a transmitter provided for an optical transmission device. The transmitter of FIG. 3 corresponds to the transmitter 11 provided for the optical transmission device 10 of FIG. 2 or the transmitter 21 provided for the optical transmission device 20 of FIG. 2. In the following description, it is assumed that the transmitter of FIG. 3 corresponds to the transmitter 11 provided for the optical transmission device 10. The configuration of the transmitter 11 is approximately the same as that of the transmitter 21.

The transmitter 11 includes a plurality of optical transmitters 41 (41-1 through 41-n), a multiplexer 42, an OSC transmitter 43, and an optical coupler 44. Each of the optical transmitters 41-1 through 41-n generates an optical signal to transmit client data. The wavelengths of the optical signals generated by the optical transmitters 41-1 through 41-n are different from each other. In other words, the optical transmitters 41-1, 41-2, 41-3, . . . , and 41-n generate optical signals of wavelengths $\lambda 1, \lambda 2, \lambda 3, \ldots$, and $\lambda n$, respectively. It is to be noted that wavelengths $\lambda 1$-$\lambda n$ are arranged, for example, in the gain band of an erbium doped fiber amplifier (EDFA). The multiplexer 42 multiplexes optical signals generated by the optical transmitters 41-1 through 41-n to generate a WDM optical signal.

The OSC transmitter 43 generates control information to control the optical transmission system. The control information may include quality information and/or transmission rate information that will be described later. Moreover, the OSC transmitter 43 generates an OSC optical signal to transmit the control information, and transmits the OSC optical signal by using an OSC (Optical Supervisory Channel (monitoring channel)). A specified wavelength, which is out of a waveband for data signals, is assigned to the OSC. That is, in this example, the OSC is arranged outside the gain band of EDFA in which wavelengths $\lambda 1$-$\lambda n$ are arranged.

Each of the optical nodes 31a-33a of FIG. 2 is provided with the function of extracting an OSC optical signal from an optical signal on the optical transmission line 3a. Each of the optical nodes 31a-33a recovers control information from the OSC optical signal, and executes the operation instructed by the control information. Further, each of the optical nodes 31a-33a transmits an OSC optical signal to the next optical node or the optical transmission device.

The optical coupler 44 adds an OSC optical signal to a WDM optical signal that is output from the multiplexer 42. In other words, the transmitter 11 outputs the WDM optical signal and the OSC optical signal to the optical transmission line 3a. The multiplexer 42 may multiplex a plurality of optical signals generated by the optical transmitters 41-1 through 41-n and an OSC optical signal generated by the OSC transmitter 43. In this case, the transmitter 11 may omit the optical coupler 44.

FIG. 4 is a diagram illustrating a configuration of a receiver provided for an optical transmission device. The receiver of FIG. 4 corresponds to the receiver 12 provided for the optical transmission device 10 or the receiver 22 provided for the optical transmission device 20. In the following description, it is assumed that the receiver of FIG. 4 corresponds to the receiver 22 provided for the optical transmission device 20. The configuration of the receiver 12 is approximately the same as that of the receiver 22.

The receiver 22 includes an optical coupler 45, a demultiplexer 46, a plurality of optical receivers 47 (47-1 through 47-n), and an OSC receiver 48. The receiver 22 receives an optical signal (WDM optical signal and OSC optical signal) generated by the transmitter 11 of FIG. 3 via the optical transmission line 3a.

The optical coupler 45 separates an OSC optical signal from the input optical signal, and guides the separated OSC optical signal to the OSC receiver 48. In addition, the optical coupler 45 guides a WDM optical signal that is included in the input optical signal to the demultiplexer 46. The demultiplexer 46 demultiplexes the WDM optical signal with respect to wavelength, and guides the optical signals of wavelengths λ1-λn to the optical receivers 47-1 through 47-n, respectively. The demultiplexer 46 may demultiplex the WDM optical signal and the OSC optical signal with respect to wavelength. In this case, the receiver 22 may omit the optical coupler 45.

The optical receivers 47-1 through 47-n recover corresponding client data from optical signals of wavelengths λ1-λn, respectively. The OSC receiver 48 obtains control information from the OSC optical signal. This control information is used for controlling the operation and state of an optical transmission device.

FIG. 2 is referred to again. In FIG. 2, the optical transmission device 10 is provided with the function of adjusting the transmission rate (or bitrate) of the data that is transmitted by using an optical signal. Here, if the optical transmission system transmits a WDM optical signal, the optical transmission device 10 can independently adjust the transmission rate of each wavelength channel.

The optical transmission device 10 notifies the optical transmission device 20 of the transmission rate of the transmitter 11 by using the OSC that is set on the optical transmission line 3a. The receiver 22 of the optical transmission device 20 receives an optical signal transmitted from the optical transmission device 10, and recovers the data from the optical signal according to the notification.

The receiver 22 of the optical transmission device 20 monitors the quality of an optical signal transmitted from the optical transmission device 10. For example, the receiver 22 monitors at least one of the OSNR, residual chromatic dispersion, and polarization mode dispersion of the input optical signal. Then the optical transmission device 20 notifies the optical transmission device 10 of the monitoring result by using an OSC that is set on the optical transmission line 3b. In this case, the transmitter 11 of the optical transmission device 10 determines the transmission rate of the optical signal according to the received monitoring result. It is to be noted that the transmitter 11 may determine the transmission rate in view of the other factors (for example, traffic volume) in addition to the monitoring result given from the optical transmission device 20.

When the optical transmission system transmits a WDM optical signal, the transmission rate information and the quality information are transmitted between a corresponding pair of the optical transmitter 41 and the optical receiver 47. For example, when the client data is transmitted from the optical transmitter 41-1 to the optical receiver 47-1, the optical transmitter 41-1 notifies the optical receiver 47-1 of the transmission rate information that indicates the transmission rate to transmit the client data. The optical receiver 47-1 notifies the optical transmitter 41-1 of the quality information that indicates the quality of an optical signal from the optical transmitter 41-1.

First Embodiment

FIG. 5 is a diagram illustrating a configuration of an optical transmitter provided for an optical transmission device of the first embodiment. The optical transmitter 41 of FIG. 5 corresponds to any one of the optical transmitters 41-1 through 41-n of FIG. 3. The optical transmitter 41 includes a plurality of client I/Fs 51a-51d, a framer 52, a CPU 53, a clock generator 54, and a transmitter module 55.

Each of the client I/Fs 51a-51d has an input port to accommodate a client line. Moreover, each of the client I/Fs 51a-51d provides an interface for terminating the client data received through the corresponding client line. The client I/Fs 51a-51d transmit the client data of the corresponding client line to the framer 52.

In the present embodiment, it is assumed that the interfaces provided by the client I/Fs 51a-51d are substantially the same. In other words, the format and transmission rate of the client data of the client lines are substantially the same.

Each of the client I/Fs 51a-51d monitors corresponding client line whether an active client (or effective client) exists. In other words, each of the client I/Fs 51a-51d monitors whether corresponding client line is active. When receiving a client signal through the corresponding client line, the client I/F (51a-51d) detects the existence of an active client. Upon detecting the existing of an active client, the client I/F (51a-51d) transmits an active client signal to the CPU 53. The client I/Fs 51a-51d may output the active client signal based on other triggers. For example, the client I/Fs 51a-51d may output the active client signal when a connector of a client line is connected to the input port. Moreover, the client I/Fs 51a-51d may output the active client signal when a negotiation with a client terminal is successful.

Although the optical transmitter 41 of FIG. 5 has four client I/Fs 51a-51d, the number of client I/Fs is not to be limited. However, it is preferable that the optical transmitter 41 has two or more client I/Fs.

The framer 52 includes buffer memory 52a-52d that correspond to the client I/Fs 51a-51d. That is, the client I/F 51a writes the client data received from the corresponding client line into the buffer memory 52a. In a similar manner, the client I/Fs 51b-51d write the client data into the corresponding buffer memory 52b-52d, respectively. For example, when only the client I/Fs 51a and 51b receive the client data from the client lines, the client data is written into the buffer memory 52a and 52b, and no data is written into the buffer memory 52c and 52d.

The framer 52 uses a clock signal generated by the clock generator 54 to read the client data from the buffer memory 52a-52d and transmit the read client data to the transmitter module 55. At this time, the framer 52 sequentially reads the client data from the buffer memory 52a-52d that store the client data. For example, when the client data is written only in the buffer memory 52a and 52b, the framer 52 reads the client data alternately from the buffer memory 52a and 52b. That is to say, the framer 52 operates as a serializer. The framer 52 may be provided with the function of generating, for example, dummy data or padding in order to adjust the difference between the speed of data received by the client I/Fs 51a-51d and the speed of data transmitted by the transmitter module 55.

The CPU 53 determines the transmission rate of transmitting the client data according to the number of active clients. In this embodiment, the CPU 53 determines the clock frequency according to the number of active clients. Here, the CPU 53 detects the number of active clients according to an active client signal generated by the client I/Fs 51a-51d. For example, when only the client I/Fs 51a and 51b receives the client data from the client lines, the client I/Fs 51a and 51b output the active client signal, but the client I/Fs 51c and 51d do not output the active client signal. In this case, the CPU 53 detects "number of active clients=2". Note that in this embodiments, the number of active clients may be equivalent to the number of active client lines.

The CPU 53 determines the transmission rate (i.e., clock frequency) not only according to the number of active clients but also according to the quality information. The quality information indicates the quality of an optical signal as well as the characteristics of an optical transmission line. The quality information is generated by monitoring the quality (or characteristics) of a received optical signal at the optical receiver of the destination optical transmission device. The destination optical transmission device is an optical transmission device that receives an optical signal transmitted from the optical transmitter 41, and corresponds to the optical transmission device 20 of FIG. 2. The destination optical transmission device notifies the optical transmitter 41 of the quality information by using the OSC described above.

The CPU 53 generates a clock selection signal specifying the clock frequency that is determined according to the number of active clients and the quality information. The clock selection signal is given to the clock generator 54. In addition, the CPU 53 notifies the destination optical transmission device of the transmission rate (or clock frequency) of an optical signal by using the OSC.

The clock generator 54 outputs a clock signal that is specified by the clock selection signal. Here, the clock generator 54 includes, for example, two or more oscillators whose oscillation frequencies are different from each other.

In the example of FIG. 5, the clock generator 54 has oscillators CLK1-CLK4. In this case, the clock generator 54 selects one of the oscillators CLK1-CLK4 according to the clock selection signal, and outputs a clock signal that is generated by the selected oscillator. The clock signal generated by the clock generator 54 is given to the framer 52 and the transmitter module 55.

The framer 52 uses the clock signal generated by the clock generator 54 to read the client data from the buffer memory 52a-52d. The client data read from the buffer memory 52a-52d is transmitted to the transmitter module 55.

The transmitter module 55 includes a buffer memory 55a, a driver 55b, a light source (LD) 55c, and an optical modulator 55d. The client data output from the framer 52 is written into the buffer memory 55a. The transmitter module 55 reads the client data from the buffer memory 55a by using the clock signal generated by the clock generator 54.

The driver 55b generates a driving signal from the client data that is read from the buffer memory 55a. At this time, the driver 55b generates the driving signal from the client data according to the modulation scheme of the optical modulator 55d.

The optical modulator 55d generates an optical signal to transmit the client data by modulating CW light output from the light source 55c with the driving signal generated by the driver 55b. The modulation scheme of the optical modulator 55d is not to be limited, but is, for example, QPSK or DQPSK. Moreover, the optical modulator 55d may transmit the client data by using a pair of polarizations (X-polarization and Y-polarization). In other words, the optical modulator 55d may transmit, for example, a DP-QPSK optical signal.

In the above-described optical transmitter 41, the client lines connected to the client I/Fs 51a-51d transmit, for example, the client data of 10 Gbit/s, respectively. In this case, the oscillators CLK1-CLK4 in the clock generator 54 generate clock signals as follows, respectively.

CLK1: Clock signal for reading data from buffer memory at 10 Gbit/s
CLK2: Clock signal for reading data from buffer memory at 20 Gbit/s
CLK3: Clock signal for reading data from buffer memory at 30 Gbit/s
CLK4: Clock signal for reading data from buffer memory at 40 Gbit/s For example, in the configuration of reading the data of 1 bit from buffer memory in one cycle of a clock signal, the frequencies of the oscillators CLK1-CLK4 are as follows.

CLK1: 10 GHz
CLK2: 20 GHz
CLK3: 30 GHz
CLK4: 40 GHz

In the configuration of reading the data of n bits from buffer memory in one clock cycle, however, the oscillation frequency of the oscillator CLK1 is 10/n GHz. The similar calculation may be applied to the oscillators CLK2-CLK4.

It is to be noted that the CPU 53 is an example of a detector configured to detect the number of active clients. Moreover, the CPU 53 is an example of a processor configured to determine the transmission rate of an optical signal or the frequency of a clock signal. The clock generator 54 and the transmitter module 55 are an example of an optical signal generator that generate and transmit an optical signal.

Figure 6:
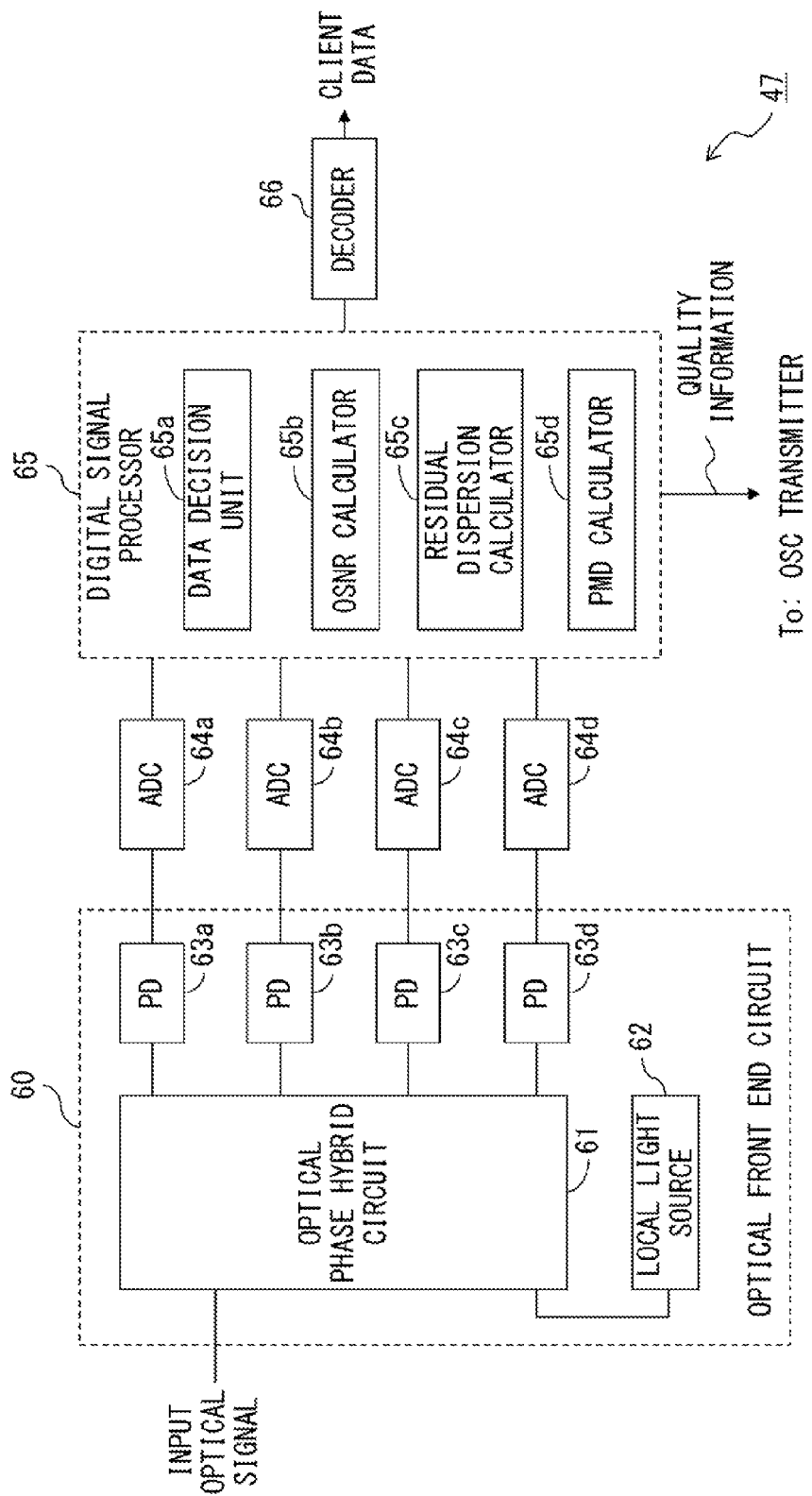
FIG. 6 is a diagram illustrating a configuration of an optical receiver provided for an optical transmission device of the first embodiment.

FIG. 6 is a diagram illustrating a configuration of an optical receiver provided for an optical transmission device of the first embodiment. The optical receiver 47 of FIG. 6 corresponds to any one of the optical receivers 47-1 through 47-n of FIG. 4.

The optical receiver 47 is a digital coherent receiver, and includes an optical front end circuit 60, A/D converters 64a-64d, a digital signal processing unit 65, and a decoder 66. The optical receiver 47 receives an optical signal that is transmitted from the optical transmitter 41 of FIG. 5.

The optical front end circuit 60 includes an optical phase hybrid circuit 61, a local light source 62, and photodetectors 63a-63d. The optical phase hybrid circuit 61 obtains I component and Q component of an optical signal by mixing an input optical signal with the local oscillation light that is output from the local light source 62. In the present embodiment, the modulation scheme is DP-QPSK. Accordingly, the optical phase hybrid circuit 61 obtains I component and Q component of the X-polarization of an input optical signal and I component and Q component of the Y-polarization of the input optical signal. The local light source 62 generates CW light whose frequency is approximately the same as that of the light source 55c of the optical transmitter 41 of FIG. 5.

Each of the photodetectors 63a-63d includes a pair of photodiodes that are connected in series, and outputs an electric signal that represents the inputted light. In the example of FIG. 6, the photodetectors 63a, 63b, 63c, and 63d output electric signals that represent I component of the X-polarization, Q component of the X-polarization, I component of the Y-polarization, and Q component of the Y-polarization, respectively.

The A/D converters 64a-64d converts the electric signals output from the photodetectors 63a-63d into digital data, respectively. In other words, the A/D converters 64a, 64b, 64c, and 64d output the digital data that represents I component of the X-polarization, Q component of the X-polarization, I component of the Y-polarization, and Q component of the Y-polarization, respectively.

The digital signal processing unit 65 includes a DSP (Digital Signal Processor), and recovers a symbol from the digital data that represents I component and Q component of the X-polarization and I component and Q component of the Y-polarization. Here, the digital signal processing unit 65 provides a data decision unit 65a, an OSNR calculator 65b, a residual dispersion calculator 65c, and a PMD calculator 65d. The DSP realizes the data decision unit 65a, the OSNR calculator 65b, the residual dispersion calculator 65c, and the PMD calculator 65d by, for example, executing software program. However, some part of the data decision unit 65a, the OSNR calculator 65b, the residual dispersion calculator 65c, and the PMD calculator 65d may be realized by a hardware circuit.

The data decision unit 65a recovers a symbol transmitted by the X-polarization from 1 component and Q component of the X-polarization of an input optical signal, and rrecovers a symbol transmitted by the Y-polarization from 1 component and Q component of the Y-polarization of the input optical signal. In QPSK (or DQPSK), one symbol transmits 2-bit data. Accordingly, in DP-QPSK, the data decision unit 65a recovers 4-bit data from a set of digital data in one symbol time period.

The OSNR calculator 65b calculates OSNR of an input optical signal. The residual dispersion calculator 65c calculates the residual chromatic dispersion of the input optical signal. The PMD calculator 65d calculates the polarization mode dispersion of the input optical signal. Here, a method for calculating the OSNR, residual chromatic dispersion, and polarization mode dispersion from 1 component and Q component of an input optical signal is publicly known. In other words, the digital signal processing unit 65 may calculate the OSNR, residual chromatic dispersion, and polarization mode dispersion from 1 component and Q component of the input optical signal by using a publicly known algorithm.

It is not always necessary for the digital signal processing unit 65 to calculate all of the OSNR, residual chromatic dispersion, and polarization mode dispersion. The digital signal processing unit 65 calculates at least one of the OSNR, residual chromatic dispersion, and polarization mode dispersion. Accordingly, the digital signal processing unit 65 generates the quality information that includes at least one of the OSNR, residual chromatic dispersion, and polarization mode dispersion.

The decoder 66 decodes the data that is recovered by the data decision unit 65a of the digital signal processing unit 65. In other words, the decoder 66 obtains the client data.

Figure 7:
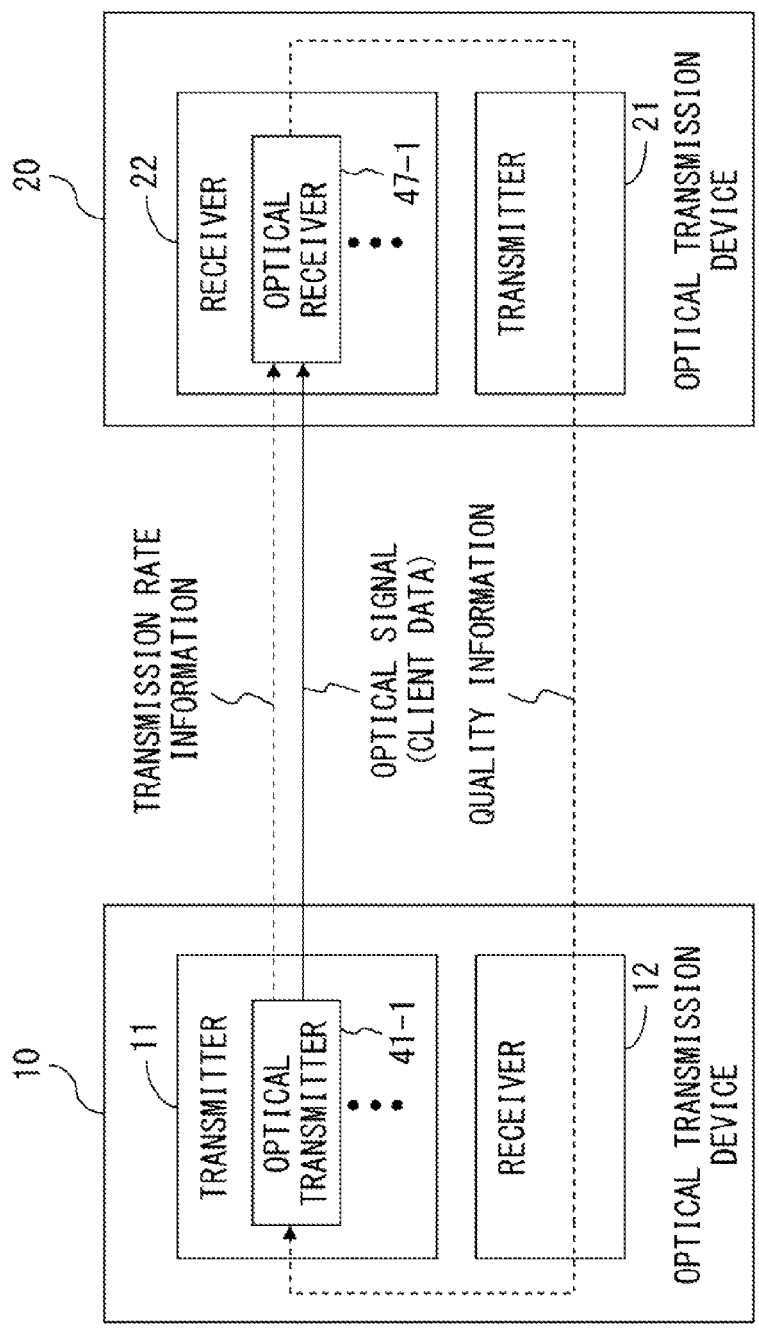
FIG. 7 is a diagram illustrating the transmission path of an optical signal and control information.

FIG. 7 is a diagram describing the transmission path of an optical signal and control information. In this example, it is assumed that an optical signal is transmitted from the optical transmitter 41-1 to the optical receiver 47-1 through the optical transmission line 3a. This optical signal transmits the client data of the client line that is accommodated in the optical transmitter 41-1. It is to be noted that optical nodes are omitted in FIG. 7.

In this case, the optical receiver 47-1 detects the quality of the optical signal that is transmitted from the optical transmitter 41-1. The quality of the optical signal is at least one of the OSNR, residual chromatic dispersion, and polarization mode dispersion, as described above. The optical receiver 47-1 notifies the optical transmitter 41-1 of the quality information that indicates the detected quality. At this time, the transmitter 21 of the optical transmission device transmits the quality information to the optical transmission device 10 by using an OSC that is set on the optical transmission line 3b. Accordingly, the receiver 12 of the optical transmission device 10 receives the quality information via the OSC on the optical transmission line 3b. The receiver 12 provides this quality information to the optical transmitter 41-1.

The optical transmitter 41-1 determines the transmission rate and clock frequency of an optical signal that transmits the client data according to the number of active clients of the optical transmitter 41-1 and the quality information received from the optical receiver 47-1. Then the optical transmitter 41-1 transmits an optical signal carrying the client data at the determined transmission rate, and notifies the optical receiver 47-1 of the transmission rate information that indicates the transmission rate. At this time, the transmitter 11 of the optical transmission device 10 transmits the transmission rate information to the optical transmission device 20 by using an OSC that is set on the optical transmission line 3a. Accordingly, the receiver 22 receives the transmission rate information via the OSC on the optical transmission line 3a, and provides this transmission rate information to the optical receiver 47-1.

The optical receiver 47-1 recovers data from a received optical signal according to the received transmission rate information. At this time, the optical receiver 47-1 generates a clock signal in the frequency designated by the transmission rate information. The A/D converters 64a-64d output digital data representin the input optical signal by using this clock signal. Moreover, the digital signal processing unit 65 and the decoder 66 operates by using this clock signal.

The optical transmission device 20 may transmit the quality information to the optical transmission device 10 periodically. Moreover, the optical transmission device 10 transmits the transmission rate information to the optical transmission device 20, for example, when initialization is performed or the transmission rate is changed.

Figure 8:
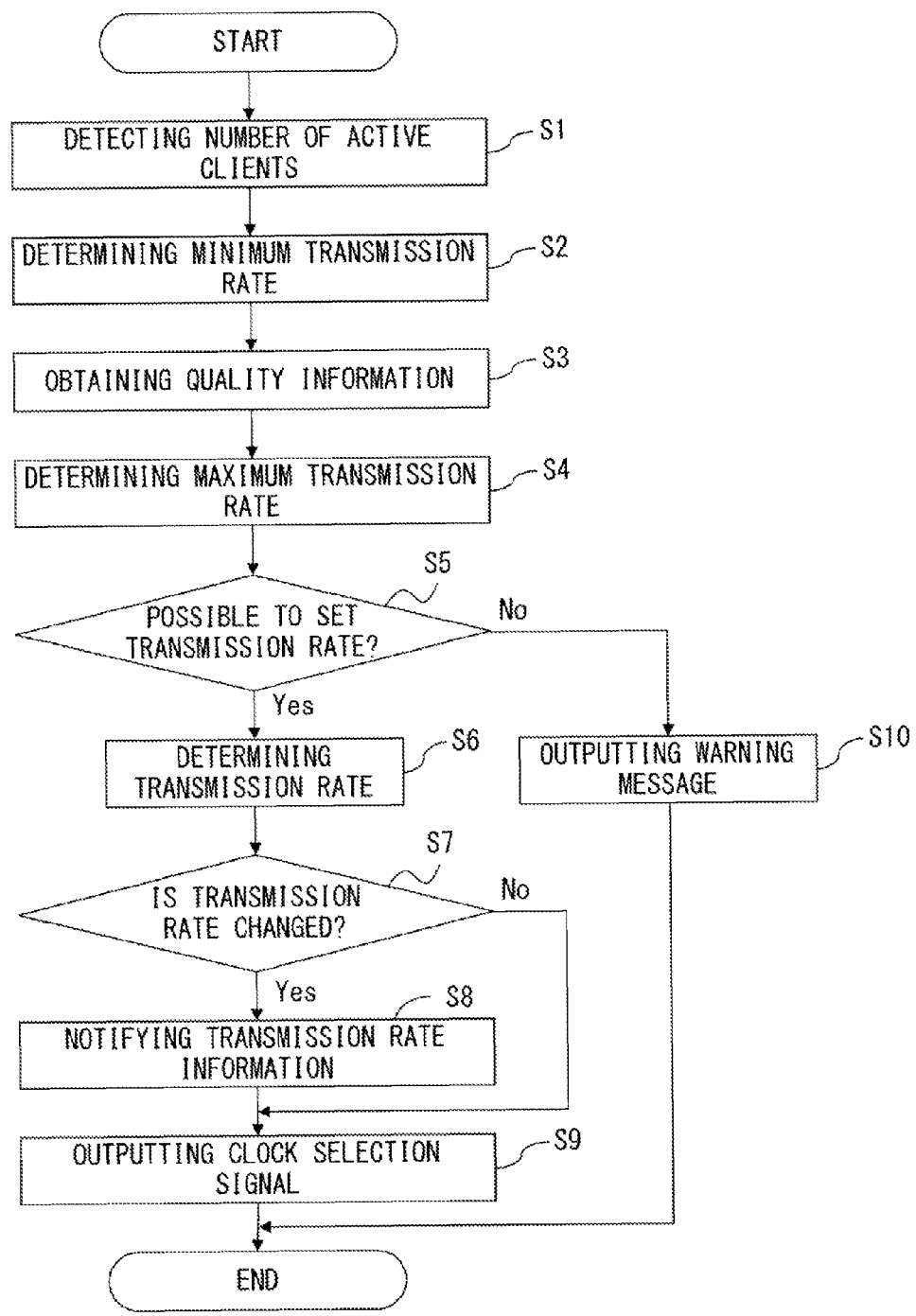
FIG. 8 is a flowchart illustrating the processes of determining the transmission rate in the first embodiment.

FIG. 8 is a flowchart illustrating the processes of determining the transmission rate in the first embodiment. The processes are executed by the CPU 53 in the optical transmitters 41-1 through 41-n, respectively. The processes may be executed periodically.

In S1, the CPU 53 detects the number of active clients. In other words, the CPU 53 detects the number of active client lines among client lines accommodated by the client I/Fs 51a-51d of the relevant optical transmitter. The CPU 53 detects the number of active clients, for example, by using an active client signal that is output from the client I/Fs 51a-51d, as described above. Alternatively, the CPU 53 may detect the number of active clients by making an inquiry to each of the client I/Fs 51a-51d as to whether or not the client line is active.

In S2, the CPU 53 determines the minimum transmission rate $R_{min}$ according to the number of active clients detected in S1. Here, it is assumed that the frequency of a clock signal used by the framer 52 and the transmitter module 55 to read the data from the buffer memory is proportional to the transmission rate of an optical signal that transmits the client data. In this case, the CPU 53 substantially determines the minimum clock frequency in S2.

In S3, the CPU 53 obtains the quality information. As described with reference to FIG. 7, the quality information is generated by an optical transmission device that receives an optical signal. The CPU 53 receives the quality information from correspondent optical transmission device via the OSC.

In S4, the CPU 53 determines the maximum transmission rate $R_{max}$ according to the quality information obtained in S3. In other words, the CPU 53 substantially determines the maximum clock frequency.

In S5, the CPU 53 determines whether it is possible to set the transmission rate in the range of being higher than or equal to the minimum transmission rate determined in S2 and being lower than or equal to the maximum transmission rate determined in S4. For example, when $R_{min} \leq R_{max}$, the CPU 53 determines that it is possible to set the transmission rate.

When it is possible to set the transmission rate, in S6, the CPU 53 determines the transmission rate of the optical signal that transmits the client data. In other words, the CPU 53 substantially determines the clock frequency.

In S7, the CPU 53 compares a current transmission rate with the newly determined transmission rate. When the transmission rate is changed (that is, when the newly determined transmission rate is different from the current transmission rate), in S8, the CPU 53 generates transmission rate information that indicates the new transmission rate. As described with reference to FIG. 7, the transmission rate information is given to an optical transmission device that receives the optical signal by using an OSC. When the transmission rate is unchanged, S8 may be skipped.

In S9, the CPU 53 generates a clock selection signal to select the clock signal that corresponds to the transmission rate determined in S6. By so doing, the clock generator 54 outputs a clock signal of the frequency that corresponds to the clock selection signal.

When it is not possible to set the transmission rate (S5: No), in S10, the CPU 53 outputs a warning message. This warning message indicates, for example, that "specified level of quality cannot be secured only by adjusting the transmission rate". In this case, a network administrator may consider, for example, the arrangement of the optical regenerator 5 illustrated in FIG. 1B or FIG. 1C in response to the warning message.

One example will be given. It is assumed in the following description that each of the client lines transmits the client data of 10 Gbit/s. Moreover, it is assumed that the optical transmitter 41 can select one of 10 Gbit/s, 20 Gbit/s, 30 Gbit/s, and 40 Gbit/s as the transmission rate of an optical signal.

In the above-described optical transmitter 41, it is assumed that the CPU 53 has detected, for example, "number of active clients=2". In this case, the CPU 53 determines the minimum transmission rate $R_{min}$ of the optical signal as follows.

$R_{min}$=2×10 Gbit/s=20 Gbit/s

In other words, when "number of active clients=2" is obtained, the optical transmitter 41 can select one of 20 Gbit/s, 30 Gbit/s, and 40 Gbit/s as the transmission rate of the optical signal.

Next, the CPU 53 determines the maximum transmission rate $R_{max}$ according to the quality information. The procedures of determining the maximum transmission rate $R_{max}$ are as follows.

In order for the optical receiver 47 to recover the client data from a received optical signal, it is preferable for the received optical signal to have good quality above a target level that is determined according to the transmission rate. Here, "recover the client data" indicates, for example, that the bit error rate is below a specified level.

The tolerance of reception quality varies depending on the transmission rate. In other words, the condition of tolerance is mild when the transmission rate is low, and the condition of tolerance is severe when the transmission rate is high. For example, when the transmission rate is doubled, the OSNR tolerance increases by 3 dB. Moreover, when the transmission rate is doubled, the polarization mode dispersion tolerance becomes half. Further, when the transmission rate is doubled, the residual chromatic dispersion tolerance becomes quarter.

The optical transmitter 41 has a table in which, for example, the relationship between the tolerance of the OSNR, polarization mode dispersion, and residual chromatic dispersion and the transmission rate is stored. When the quality information is obtained, the CPU 53 determines the maximum transmission rate with reference to the table. For example, it is assumed that the relationship between the transmission rate and the residual chromatic dispersion tolerance is as follows.

10 Gbit/s: 200 ps/nm
20 Gbit/s: 50 ps/nm
30 Gbit/s: 22 ps/nm
40 Gbit/s: 12 ps/nm At this time, for example, it is assumed that the residual chromatic dispersion detected by the optical receiver 47 is 20 ps/nm. This detection result is given to the CPU 53 as the quality information.

The CPU 53 determines the maximum transmission rate according to "residual chromatic dispersion=20 ps/nm". In this case, the detected residual chromatic dispersion (20 ps/nm) satisfies the tolerance (22 ps/nm) that corresponds to 30 Gbit/s, but exceeds the tolerance (12 ps/nm) that corresponds to 40 Gbit/s. In other words, in this case, the CPU 53 determines that the optical receiver 47 can recover the client data if the transmission rate is 30 Gbit/s but the optical receiver 47 cannot recover the client data if the transmission rate is 40 Gbit/s. Accordingly, the CPU 53 determines that "maximum transmission rate=30 Gbit/s" in response to the given quality information (residual chromatic dispersion).

The CPU 53 determines the maximum transmission rate also for the OSNR and the polarization mode dispersion, respectively. Then the CPU 53 selects the smallest value out of the three maximum transmission rates. For example, if the maximum transmission rates corresponding to the OSNR, polarization mode dispersion, and residual chromatic dispersion are 30 Gbit/s, 40 Gbit/s, and 30 Gbit/s, respectively, "30 Gbit/s" is selected. Due to these procedures, the maximum transmission rate is determined so as to satisfy the tolerance for all the OSNR, polarization mode dispersion, and residual chromatic dispersion.

When "maximum transmission rate=30 Gbit/s", the optical transmitter 41 can select one of 10 Gbit/s, 20 Gbit/s, and 30 Gbit/s as the transmission rate of an optical signal.

Subsequently, the CPU 53 determines the transmission rate of an optical signal according to the minimum transmission rate of S2 and the maximum transmission rate of S4. That is, the CPU 53 selects the transmission rate that satisfies the two conditions of "higher than or equal to the minimum transmission rate of S2" and "lower than or equal to the maximum transmission rate of S4". In the present embodiment, the selectable transmission rates that satisfy "higher than or equal to the minimum transmission rate of S2 (20 Gbit/s)" are as follows. Gbit/s, 30 Gbit/s, 40 Gbit/s Moreover, the selectable transmission rates that satisfy "lower than or equal to the maximum transmission rate of S4 (30 Gbit/s)" are as follows. 10 Gbit/s, 20 Gbit/s, 30 Gbit/s The transmission rates that satisfy the above-mentioned two conditions are "20 Gbit/s" and "30 Gbit/s". Accordingly, the CPU 53 can select either "20 Gbit/s" or "30 Gbit/s". If there are two or more selectable transmission rates in S6, the CPU 53 may select one transmission rate according to a given communication policy. For example, when the given communication policy is "to reduce the power consumption of the optical transmitter 41 (and optical receiver 47)", the lowest transmission rate (in the example above, it is 20 Gbit/s) may be selected from selectable transmission rates.

As described above, in the first embodiment, the optical transmitter 41 determines the transmission rate according to the number of active clients and the reception quality of an optical signal. Accordingly, in the first embodiment, it is possible to flexibly operate the optical network. On the other hand, in the existing optical networks, it is difficult to flexibly operate the optical network since the transmission rate of an optical signal is fixed.

Figure 9A:
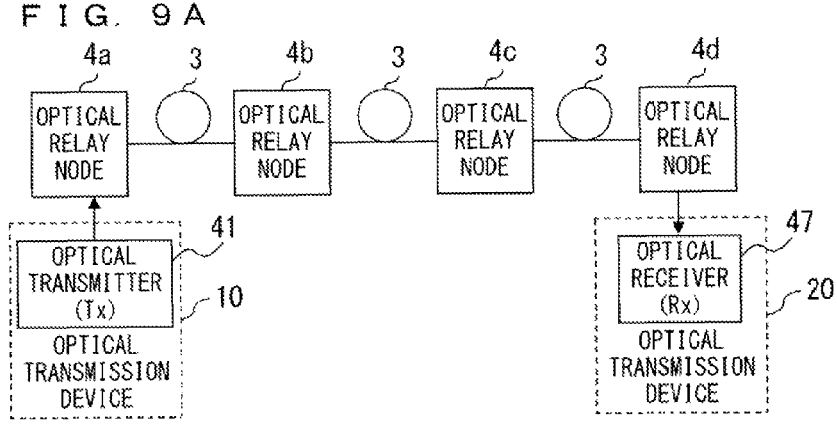
FIGS. 9A-9C are diagrams illustrating embodiments in which the transmission rate is changed.
Figure 9B:
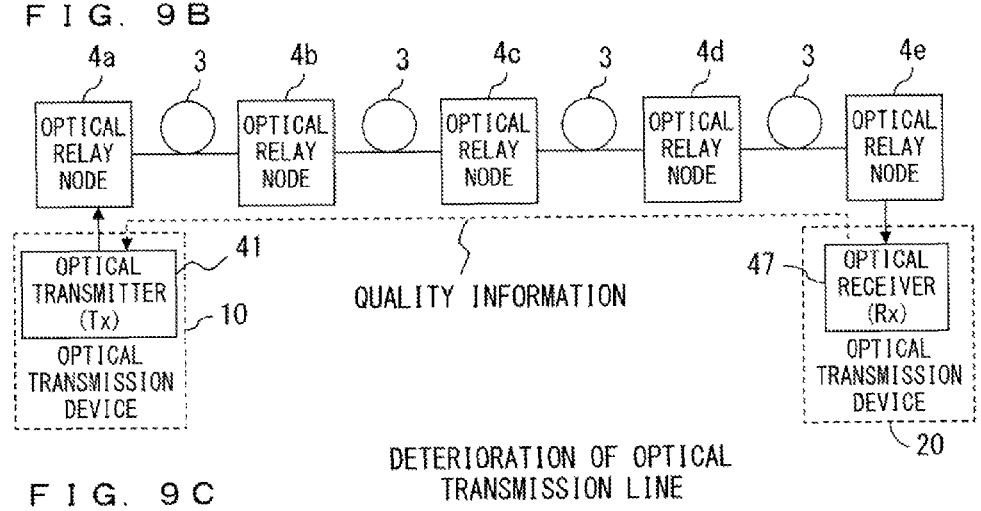
Figure 9C:
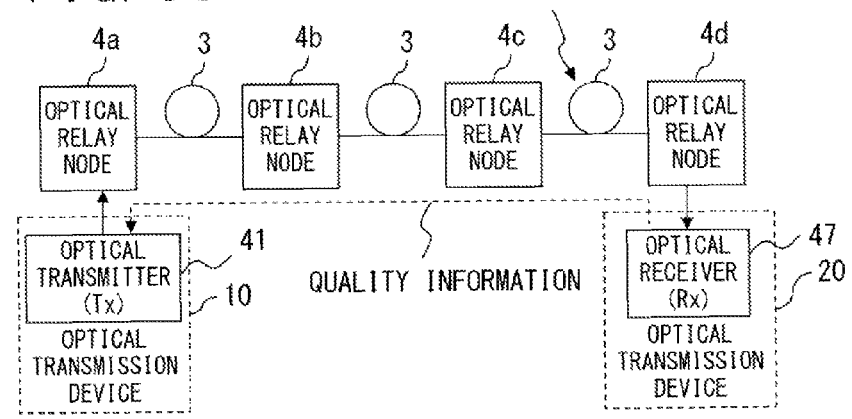

FIGS. 9A-9C illustrate embodiments in which the transmission rate is changed. In this example, as illustrated in FIG. 9A, it is assumed that an optical signal is transmitted from the optical transmitter 41 of the optical transmission device 10 to the optical receiver 47 of the optical transmission device 20. Moreover, it is assumed that the optical transmitter 41 accommodates two client lines. In other words, "number of active clients=2", and the total traffic volume of the client data is 20 Gbit/s. However, it is assumed that the optical transmitter 41 transmits an optical signal of 40 Gbit/s. In this case, the optical transmitter 41 transmits, for example, the client data of 20 Gbit/s and dummy data of 20 Gbit/s. Note that, in FIG. 9A, the quality of a received optical signal at the optical transmission device 20 is good even if the transmission rate of the optical signal is 40 Gbit/s.

In the above-described optical transmission system, as illustrated in FIG. 9B, it is assumed that the optical transmission line 3 is extended between the optical transmission devices 10 and 20. Then, the optical transmitter 41 transmits an optical signal of 40 Gbit/s in a similar manner as the operation state that is illustrated in FIG. 9A.

The optical receiver 47 monitors the quality of a received optical signal (OSNR, polarization mode dispersion, and residual chromatic dispersion), and the optical transmission device 20 notifies the optical transmitter 41 of the quality information that indicates the quality detected by the optical receiver 47. At this time, it is assumed that the quality detected by the optical receiver 47 exceeds the tolerance specified for the transmission rate of 40 Gbit/s. In this case, the optical transmitter 41 reduces the transmission rate of the optical signal so as to satisfy both the total traffic volume of the client data and the reception tolerance at the optical receiver 47. In the present embodiment, the optical transmitter 41 reduces the transmission rate of the optical signal, for example, from 40 Gbit/s to 20 Gbit/s.

FIG. 9C illustrates the state in which the quality of the optical transmission line 3 is deteriorated in the optical transmission system of FIG. 9A. In this case, the quality (OSNR, polarization mode dispersion, or residual chromatic dispersion) of a received optical signal detected by the optical receiver 47 is deteriorated, and the optical transmitter 41 recognizes the deterioration in the quality of the optical transmission line 3 due to the notification from the optical transmission device 20. Accordingly, the optical transmitter 41 reduces the transmission rate of the optical signal in a similar manner as the example of FIG. 9B.

Figure 1A:
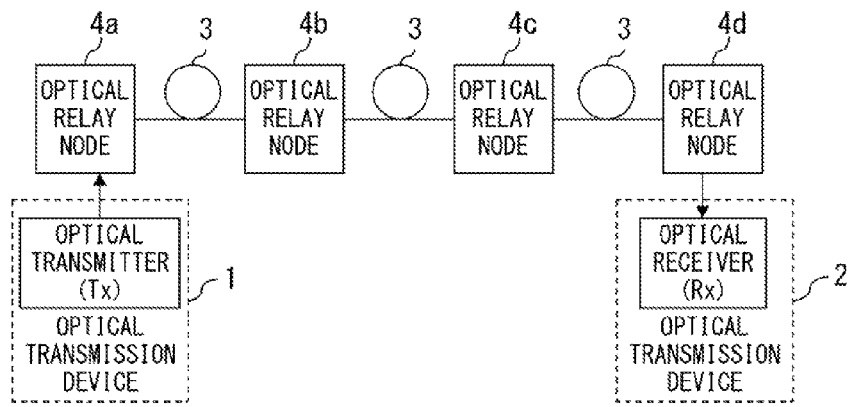
FIGS. 1A-1C are diagrams illustrating examples of an optical transmission system.
Figure 1B:
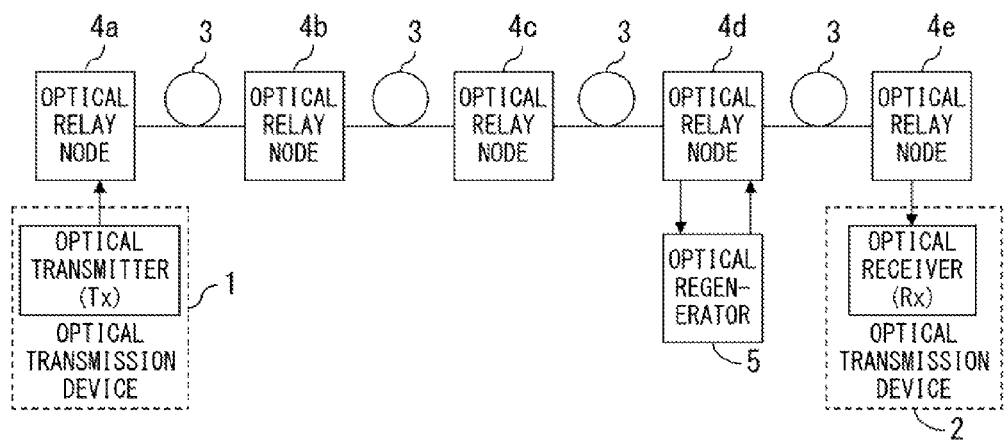
Figure 1C:
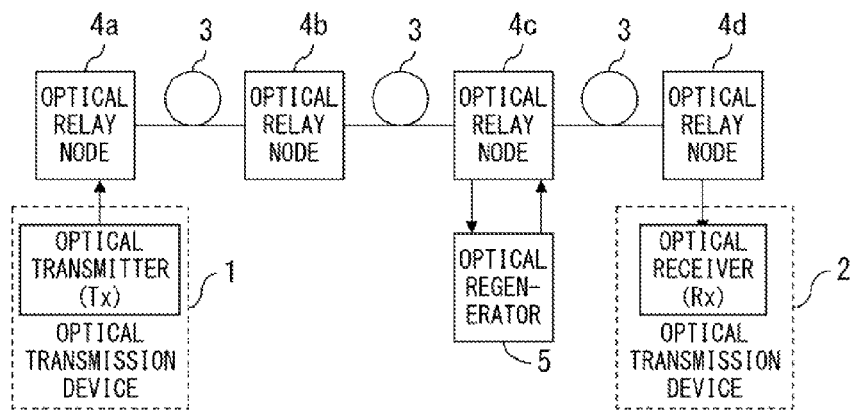

Here, the optical transmission system of FIGS. 9A-9C is compared with that of FIGS. 1A-1C. In the optical transmission system of FIGS. 1A-1C, the transmission rate of an optical signal is fixed between the optical transmission devices 1 and 2. For example, when an optical transmitter of the optical transmission device 1 can accommodate four client lines of 10 Gbit/s, the transmission rate of the optical signal is 40 Gbit/s regardless of the number of active client lines that are actually connected to the optical transmitter. For this reason, as illustrated in FIG. 1B, when the optical transmission line 3 is extended and the reception quality at the optical transmission device 2 exceeds the tolerance corresponding to 40 Gbit/s, the optical regenerator 5 needs to be provided for the optical transmission system. In a similar manner, as illustrated in FIG. 1C, also when the optical transmission line deteriorates, the optical regenerator 5 needs to be provided for the optical transmission system.

On the other hand, in the optical transmission system of the first embodiment, the transmission rate of an optical signal is variable between the optical transmission devices 10 and 20. In particular, the transmission rate of the optical signal is adjustable between the optical transmitter 41 and the optical receiver 47. Thus, when the optical transmission line 3 is extended as illustrated in FIG. 9B and the reception quality at the optical transmission device 20 exceeds the tolerance corresponding to 40 Gbit/s, the optical transmitter 41 reduces the transmission rate. At this time, the optical transmitter 41 reduces the transmission rate of the optical signal so as to satisfy the total traffic volume of the client data as well as the reception tolerance at the optical receiver 47. Accordingly, in the optical transmission system of the first embodiment, the number of spans can be increased in an optical transmission line without providing the optical regenerator 5 that is illustrated in FIG. 1B or 1C. In a similar manner, as illustrated in FIG. 9C, also when the optical transmission line deteriorates, the optical transmission system can be recovered by reducing the transmission rate of the optical signal without providing the optical regenerator 5.

Figure 10:
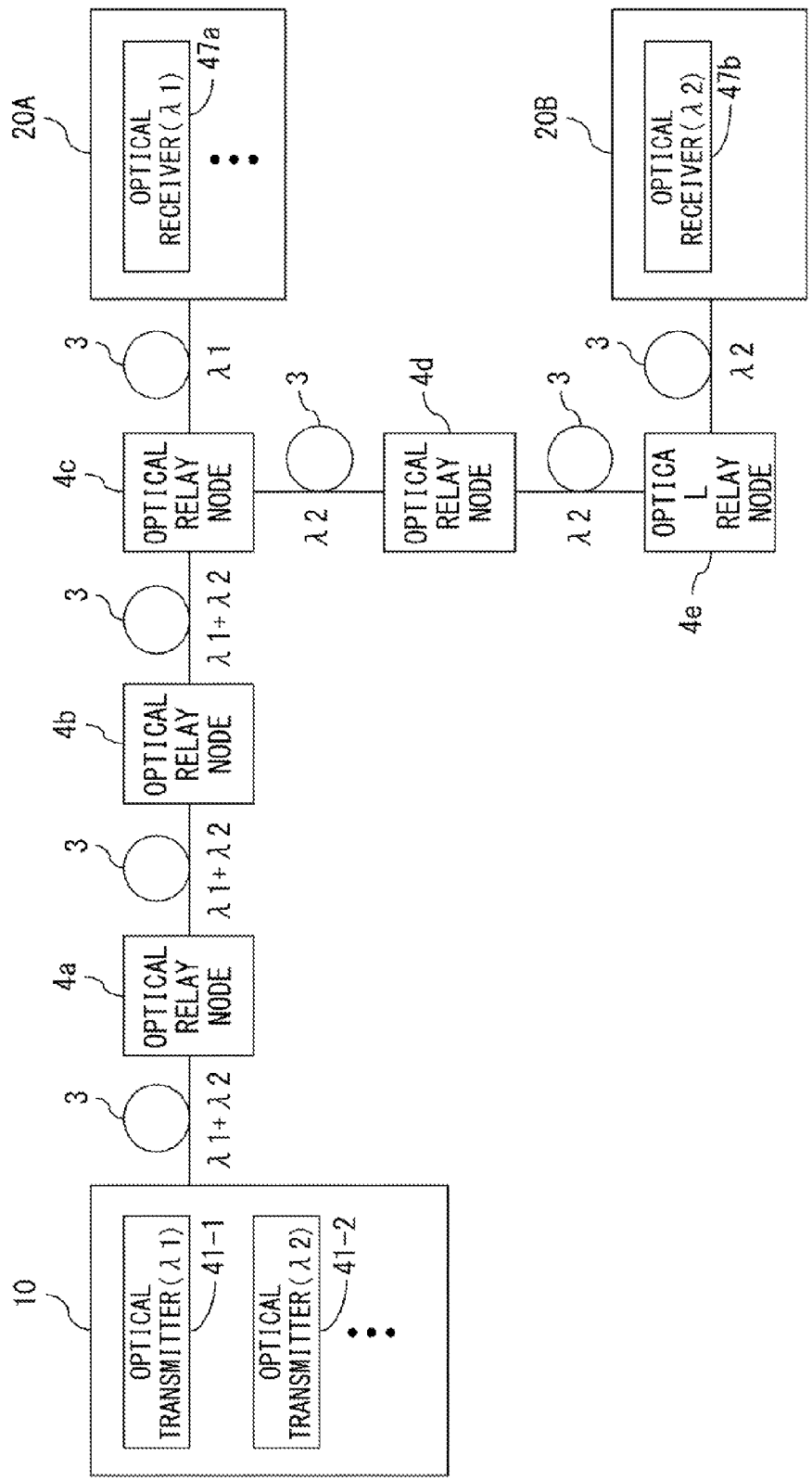
FIG. 10 is a diagram illustrating a method of adjusting the transmission rate for every wavelength channel.

FIG. 10 is a diagram illustrating a method of adjusting the transmission rate for every wavelength channel. In the example of FIG. 10, an optical signal is transmitted from the optical transmission device 10 to the optical transmission devices 20A and 20B. Here, the optical transmitter 41-1 generates an optical signal of wavelength $\lambda 1$, and the optical transmitter 41-2 generates an optical signal of wavelength $\lambda 2$. The optical transmission device 10 transmits a WDM optical signal that includes the optical signal of wavelength $\lambda 1$ and the optical signal of wavelength $\lambda 2$. The optical node 4c guides the optical signal of wavelength $\lambda 1$ to the optical transmission device 20A, and guides the optical signal of wavelength $\lambda 2$ to the optical transmission device 20B. The optical node 4c includes, for example, a WSS (Wavelength Selective Switch).

In this case, an optical receiver 47a notifies the optical transmitter 41-1 of the quality information that indicates the quality of a received optical signal. Then the optical transmitter 41-1 determines the transmission rate of an optical signal of wavelength $\lambda 1$ according to the number of active clients of the optical transmitter 41-1 and the notification from the optical receiver 47a. Ina similar manner, the optical receiver 47b notifies the optical transmitter 41-2 of the quality information that indicates the quality of a received optical signal. Then the optical transmitter 41-2 determines the transmission rate of an optical signal of wavelength $\lambda 2$ according to the number of active clients of the optical transmitter 41-2 and the notification from the optical receiver 47b.

As described above, the optical transmission system of the first embodiment can adjust the transmission rate for every wavelength channel. Accordingly, for example, when a specified wavelength channel in the WDM path is extended, only the transmission rate of that wavelength channel needs to be adjusted. Moreover, when the optical transmission line deteriorates in a section in which a wavelength channel of only a part of WDM optical signal is established, only the transmission rate of that wavelength channel needs to be adjusted. For example, when the optical transmission line 3 deteriorates between the optical nodes 4d and 4e in FIG. 10, only the transmission rate of the wavelength channel X2 needs to be adjusted.

However, when a span in which a WDM path including a plurality of wavelength channels deteriorates, a negotiation is executed to adjust the transmission rate of each of the plurality of wavelength channels in that span. For example, in an optical transmission system with which a active system and a protection system are provided, when a span of the optical transmission line in the active system deteriorates, the optical signal transmitted through that deteriorated span is once guides to the protection system. At this time, the optical transmission system notifies the source optical transmission device from which the optical signal is transmitted of the quality information in the active system at the time immediately before the switching from the active system to the protection system. The source optical transmission device adjusts the transmission rate according to the quality information while the optical transmission system is operating by using the protection system. At this time, the source optical transmission device adjusts the transmission rate for all the wavekength channels that pass through the above-described deteriorated span. After that, the optical transmission system switches from the protection system back to the active system, and restarts the communication by using the active system.

As described above, according to the optical transmission device or optical network operating method according to the first embodiment, the transmission rate can be reduced as necessary in order to satisfy the quality requirement when the optical transmission system is extended. For this reason, the optical transmission system is extended without adding an optical regenerator (or with a fewer optical regenerators). In a similar manner, the optical transmission line is recovered from deterioration without adding an optical regenerator (or with a fewer optical regenerators). Accordingly, the extension of the optical transmission system or the recovery of the optical transmission line from deterioration is achieved at low cost.

Second Embodiment

In the first embodiment, the optical transmission device determines the clock frequency according to the transmission rate. On the other hand, in the second embodiment, the optical transmission system adopts OFDM, and the optical transmission device determines the number of subcarriers to be used according to the transmission rate. In other words, in the second embodiment, the transmission rate is adjusted by changing the number of subcarriers to be used.

FIG. 11 is a diagram illustrating a configuration of an optical transmitter provided for an optical transmission device of the second embodiment. An optical transmitter 41 of the second embodiment includes a plurality of client I/Fs 51a-51d, a framer 70, a CPU 53, a clock generator 54, and a transmitter module 55. The client I/Fs 51a-51d are similar to those of the first embodiment, and thus the description will be omitted.

In the second embodiment, the CPU 53 generates a subcarrier selection signal. At this time, the CPU 53 generates the subcarrier selection signal according to the number of active clients and the quality information. That is, in the second embodiment, the CPU 53 generates the subcarrier selection signal after executing S1-S8 of FIG. 8.

It is assumed that the optical transmitter 41 can use, for example, a specified number of subcarriers. In this example, it is assumed that, for example, eight subcarriers are prepared. Moreover, it is assumed that the optical transmitter 41 can select one of 10 Gbit/s, 20 Gbit/s, 30 Gbit/s, and 40 Gbit/s as the transmission rate of an optical signal. The CPU 53 outputs a subcarrier selection signal that corresponds to the transmission rate determined in S6. For example, the CPU 53 outputs the subcarrier selection signal to select two subcarriers when the transmission rate is 10 Gbit/s. Similarly, the subcarrier selection signal to select four subcarriers is generated when the transmission rate is 20 Gbit/s. The subcarrier selection signal to select six subcarriers is generated when the transmission rate is 30 Gbit/s. The subcarrier selection signal to select eight subcarriers is generated when the transmission rate is 40 Gbit/s.

The framer 70 includes a subcarrier generator 71, a mapper 72, and an inverse Fourier converter (IFFT: inverse Fast Fourier Transformer) 73. In a similar manner as the framer 52 of FIG. 5, the framer 70 may include buffer memory 52a-52d that temporarily stores the client data that is output from the client I/Fs 51a-51d.

The subcarrier generator 71 generates active subcarriers. The active subcarrier is a subcarrier to be used for transmitting client data. The number of generated subcarriers is designated by the subcarrier selection signal. The mapper 72 maps the client data output from the client I/Fs 51a-51d on the corresponding subcarrier generated by the subcarrier generator 71. Accordingly, two or more pieces of subcarrier data are generated. The IFFT 73 generates time-domain data by performing an inverse Fourier transform on the output data from the mapper 72.

The transmitter module 55 of the second embodiment includes a D/A converter 55e, a driver 55f, a light source 55c, and an optical modulator 55d. The D/A converter 55e converts the time-domain data generated by the framer 70 into an analog signal. The driver 55f generates a driving signal from an output signal of the D/A converter 55e according to the modulation scheme of the optical modulator 55d. The optical modulator 55d modulates CW light output from the light source 55c with the driving signal generated by the driver 55f to generate an optical signal to transmit the client data.

In a similar manner as the first embodiment, an optical receiver according to the second embodiment receives the transmission rate information from the corresponding optical transmitter. Although not illustrated, the optical receiver of the second embodiment includes an inverse-mapper (demapper) and a Fourier converter (FFT: Fast Fourier Transformer) that correspond to the mapper 72 and the IFFT 73. The inverse-mapper and the Fourier converter recover the client data according to the transmission rate information. Furthermore, in a similar manner as the first embodiment, the optical receiver of the second embodiment generates the quality information and transmits the generated quality information to an optical transmitter.

As described above, in the second embodiment, the transmission rate is adjusted by changing the number of subcarriers to be used. Accordingly, also in the second embodiment, the extension of the optical transmission system or the recovery of the optical transmission line from deterioration is achieved at low cost in a similar manner as the first embodiment.

Modification

In the embodiments described with reference to FIGS. 5-11, the quality information is given from an optical receiver to an optical transmitter, and that optical transmitter determines the transmission rate by using the quality information. However, it should be understood that the optical transmission system of the present invention is not limited to such configuration. That is, for example, an optical receiver may detect the quality of an optical signal and determine the maximum transmission rate in accordance with the detected quality. In this case, the optical receiver notifies an optical transmitter of the maximum transmission rate by using, for example, an OSC. Then the optical transmitter receives the information that indicates the maximum transmission rate instead of the processes of S3-S4 in the flowchart of FIG. 8. As described above, the optical transmission system of the present invention may generate control information (including the information indicating the quality and/or the maximum transmission rate) created according to the quality of an optical signal that is detected by an optical receiver to be informed to a transmitting side, and an optical transmitter may determine the transmission rate by using that control information.

In the embodiments described with reference to FIGS. 5-11, the bitrate of the client data received by each of the client I/Fs 51a-51d is substantially the same. However, it should be understood that the optical transmission device of the present invention is not limited to such configuration. In other words, the bitrate of the client data received by each of the client I/Fs 51a-51d is not necessarily the same. In this case, the CPU 53 detects, for example, the sum of the effective bitrate of the client I/Fs 51a-51d (i.e., the total traffic volume of the client data), and the CPU 53 determines the transmission rate according to the sum of the effective bitrate and the quality information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An optical transmission device comprising:
    an optical signal generator to generate and transmit an optical signal that transmits data, wherein the optical signal is obtained by multiplexing a plurality of optical signals to transmit client data that is received at an optical receiver;
    a detector to detect a number of active clients; and
    a processor to determine transmission rate of the optical signal according to the number of active clients and quality of the optical signal monitored by the optical receiver,
    wherein the processor determines the transmission rate in a range being higher than or equal to a first transmission rate that is determined according to the number of active clients and being lower than or equal to a second transmission rate that is determined according to the quality of the optical signal.

2. The optical transmission device according to claim 1, wherein
    the processor includes a frequency determination unit to determine a clock frequency according to the number of active clients and the quality of the optical signal, and
    the optical signal generator includes
        a clock generator to generate a clock signal of the clock frequency determined by the frequency determination unit,
        a transmission data generator to generate transmission data by using the clock signal, and
        an optical modulator to generate the optical signal from the transmission data.

3. The optical transmission device according to claim 2, wherein
    the frequency determination unit determines the clock frequency according to the transmission rate.

4. The optical transmission device according to claim 1, the processor includes a subcarrier selector to select the active subcarriers, the number of selected subcarriers being determined according to the number of active clients and the quality of the optical signal, and
    the optical signal generator includes
        a subcarrier data generator to generate subcarrier data by using the active subcarriers selected by the subcarrier selector,
        a transmission signal generator to generate a transmission signal by performing an inverse Fourier transform on the subcarrier data, and
        an optical modulator to generate the optical signal from the transmission signal.

5. The optical transmission device according to claim 4, wherein
    the processor determines the transmission rate in a range being higher than or equal to a first transmission rate that is determined according to the number of active clients and being lower than or equal to a second transmission rate that is determined according to quality of the optical signal, and
    the subcarrier selector selects a number of the active subcarriers according to the transmission rate.

6. The optical transmission device according to claim 1, wherein
    the quality of the optical signal includes at least one of OSNR, residual chromatic dispersion, and polarization mode dispersion.

7. An optical transmission device comprising:
    a detector to detect a total traffic volume of client data;
    an optical signal generator to generate and transmit an optical signal that transmits the client data, wherein the optical signal is obtained by multiplexing a plurality of optical signals to transmit the client data that is received at an optical receiver; and
    a processor to determine transmission rate of the optical signal according to the total traffic volume and quality of the optical signal monitored by the optical receiver,
    wherein the processor determines the transmission rate so as to satisfy both the total traffic volume of the client data and the reception tolerance at the optical receiver.

8. An optical transmission system in which an optical signal is transmitted from a first optical transmission device to a second optical transmission device, wherein
    the first optical transmission device includes
        a detector to detect a number of active clients,
        a processor to determine a transmission rate, and
        an optical signal generator to generate and transmit an optical signal that data at the transmission rate, wherein the optical signal is obtained by multiplexing a plurality of optical signals to transmit client data that is received at the second optical transmission device,
    the second optical transmission device includes
        a quality detector to detect quality of the optical signal,
        a generator to generate control information according to a detection result of the quality detector, and
        a notification unit to notify the first optical transmission device of the control information, and
    the processor determines the transmission rate of the optical signal according to the number of active clients and the control information,
    wherein the processor determines the transmission rate in a range being higher than or equal to a first transmission rate that is determined according to the number of active clients and being lower than or equal to a second transmission rate that is determined according to the quality of the optical signal.

9. A method for operating an optical network, the method comprising:
    transmitting an optical signal that transmits data from a first optical transmission device to a second optical transmission device, wherein the optical signal is obtained by multiplexing a plurality of optical signals to transmit client data that is received at the second optical transmission device;
    detecting quality of the optical signal at the second optical transmission device;
    detecting a number of active clients at the first optical transmission device; and
    determining a transmission rate of the optical signal at the first optical transmission device according to the number of active clients and the quality of the optical signal,
    wherein the transmission rate is determined in a range being higher than or equal to a first transmission rate that is determined according to the number of active clients and being lower than or equal to a second transmission rate that is determined according to the quality of the optical signal.

10. The method according to claim 9, wherein
    the optical network is a WDM network, and
    the transmission rate of an optical signal is determined for every wavelength channel according to the number of active clients and quality of an optical signal detected at the second optical transmission device.

* * * * *